United States Patent Office 3,417,820
Patented Dec. 24, 1968

3,417,820
WELL TREATING WITH AQUEOUS GELLED
SALT SOLUTIONS
Walter N. Epler and William T. Malone, Duncan, Okla.,
assignors to Halliburton Company, Duncan, Okla., a
corporation of Delaware
No Drawing. Filed Aug. 27, 1965, Ser. No. 483,352
10 Claims. (Cl. 166—42)

ABSTRACT OF THE DISCLOSURE

This patent describes a novel thickened and gelled fluid composition comprising an aqueous solution of a salt selected from the group consisting of alkali and alkaline earth metal chlorides containing an effective thickening and gelling amount of hydroxyethyl cellulose, and the method of treating a well traversing a producing formation which comprises injecting said composition into the well. The hydroxyethyl cellulose is adapted to be subsequently removed from the formation.

---

This invention pertains to novel thickened aqueous solutions of alkali and alkaline earth metal chlorides, and to their use in the treatment of wells.

Saturated solutions of calcium chloride are in common usage as high density treating fluids for wells where the fluid weight serves to control the well pressure. These saturated solutions are also used in the familiar hydrafrac process for well stimulation in zones of lower permeability. In this process, the solution serves as a carrier for sand grains which is pumped down the well and into the formation so that the crevices formed are propped open by the sand grains. Saturated sodium chloride solutions may also be used as well treating fluids where moderately dense fluids are needed, or where water sensitive clays are present in the rock. When these solutions are used as fracturing fluids, it is often desirable to thicken the fluids to improve their ability to transport granular materials such as sand. However, the common thickener materials such as the natural gums and starches will not hydrate in the saturated calcium chloride solutions, and therefore, no gel or thickness is imparted to the fluid. The inability of calcium chloride solutions to be gelled by the available thickener materials has restricted the field of use of these dense fluids. In the case of sodium chloride solutions which have been previously gelled, the thickener materials employed tend to leave a clogging residue in the formation pores. The residue inhibits production and often necessitates costly clean-up operations after injection of the thickened fluid.

Quite surprisingly, we have found that hydroxyethyl cellulose thickens and gels both saturated and unsaturated solutions of the alkali and alkaline earth metal chlorides including calcium chloride and sodium chloride; thus, providing a new fluid for use in the treatment of wells. Moreover, the thickened and gelled solutions of this invention leave little or no residue within the formation upon reversion. In addition, we have found that the hydroxyethyl cellulose also acts as a friction reducer for the fluids in turbulent flow.

Accordingly, it is a principal object of the present invention to provide a novel thickened and gelled fluid useful for use in the treatment of wells.

A further object of the present invention is to provide a thickened fluid which is characterized by reduced friction in turbulent flow.

In another aspect of the present invention, it is an object thereof to provide a thickened fluid which upon reversion within fluid does not leave a plugging residue within the matrix of the formation.

These and other objects of our invention will become apparent from the more detailed description which follows.

Briefly, the present invention comprises a thickened and gelled fluid comprising an aqueous solution of a salt selected from the group consisting of alkali and alkaline earth metal chlorides, containing an effective thickening and gelling amount, usually on the order of from about 0.01 percent to about 1.5 percent by weight of the fluid, of hydroxyethyl cellulose. The invention additionally comprehends the injection of the novel thickened and gelled fluid into a well bore traversing a producing formation. More particularly, our invention includes the use of the novel thickened and gelled fluid as a carrier for granular materials in the method of fracturing the formation surrounding the bore hole of a well.

The hydroxyethyl cellulose will thicken saturated solutions without having to be mixed into or with an emulsion, emulsifier, or other thickening additive. According to the present invention, by the use of hydroxyethyl cellulose, a solution of an alkali or alkaline earth metal chloride in any concentration up to saturation may be thickened and gelled. To provide a gelled weighted fluid, it is preferred to use a saturated solution of calcium chloride generally containing from about 11 to 12 pounds of calcium chloride per gallon of water.

It has been found that the hydroxyethyl cellulose leaves no undesirable residue in the well after the thickened and gelled solution reverts to a thin fluid. Moreover, the reversion to the thin fluid can be accomplished simply by the addition of internal breakers, such as oxidizing agents like ammonium persulfate or cellulolytic enzymes including cellulose 1000. The amount of breaker required to provide revision is a function of various conditions including the desired reversion time, formation temperature, and the like, and thus may be readily determined for any given well and treating fluid. Since the hydroxyethyl cellulose does not leave a residue, it is non-damaging to the producing formation and does not tend to plug the matrix. In contrast thereto, the materials previously used in well treating fluids such as guar gum, other natural gums, or starch leave residues which damage the producing formation by plugging the matrix.

While the present invention envisions the use of any hydroxyethyl cellulose as the thickening and gelling agent, one preferred type is the hydroxyethyl cellulose sold commercially under the trademark "Natrosol" by the Hercules Powder Company of Wilmington, Del. Natrosol is avaiable in various viscosities as shown in the following table.

TABLE A.—VISCOSITY LIMITS OF WATER SOLUTIONS

| Viscosity type | Brookfield viscosity at 25° C. at varying concentrations (cps.) | | |
|---|---|---|---|
| | 1% | 2% | 5% |
| H | 1,500–2,500 | 25,000 | |
| M | | 4,500–6,500 | |
| G | | 150–400 | |
| J | | | 150–400 |
| L | | | 75–150 |
| HH | 3,000–4,000 | 80,000–100,000 | |

All viscosity types conform to the following additional specifications:

pH _____ 6.5–8.5.
Color _____ White to slight tan.
Moisture (as packed), percent ____ 5 (max.).
Particle size: passing U.S. #40
  mesh, percent _____ 90 (min.).
Bulk density, g./ml. _____ 0.55–0.75.

The novel thickening and gelled fluids of this invention are used in well fracturing to increase productivity following procedures and using equipment which are already familiar to those skilled in the art. For example, one method of fracturing employing the fluids of this invention comprises introducing the fluid containing the hydroxyethyl cellulose into a confined zone of a well at a rate sufficient to increase the pressure exerted in the zone until formation fracture occurs, as evidenced by a decrease in resistance to flow of the fluid. Thereafter, injection is continued to displace a part of the fluid into passages formed in the formation. The fluid may be further displaced into the formation by the injection of additional liquid as a follower. The thickened and gelled fluid may also contain sand or other granular materials which function to prop the formation. After the fluid has remained in the well for a time sufficient for breaking, it may be readily removed because of its reduced viscosity by pumping, producing of the well, or any other suitable means.

The following examples are presented solely to illustrate the invention and accordingly should not be regarded as limiting in any way. In the examples, the parts and percentages are by weight unless otherwise indicated.

Example I

The gellation and break time data were obtained using a solution containing 30 lbs. of hydroxyethyl cellulose (Natrosol HH) per 1000 gallons of water. The gellation rate data were obtained at 80° F. using a Fann V-G meter at 300 r.p.m.

TABLE I.—GELLATION RATE: 30 LBS. CONCENTRATION PER 1000 GALLONS FRESH WATER

Fann V-G Meter at 300 r.p.m. vs. Time

Time, minutes: 20C
1.5 ------------------------------------ 14.2
2 ---------------------------------- 16.0
3 ---------------------------------- 18.0
4 ---------------------------------- 20.2
10 ---------------------------------- 20.4
15 ---------------------------------- 20.4

Example II

Following the procedure described above, the gellation and breaking rate was measured for salt solutions containing the indicated amounts of sodium chloride and calcium chloride at 80° F., the concentration of hydroxyethyl cellulose (Natrosol HH) being 20 lbs. per 1000 gallons of water. The solutions also contained 5 lbs. of ammonium persulfate per 1000 gallons of water as a breaking material.

TABLE II.—FANN V-G METER AT 300 R.P.M. vs. TIME

| Time (hrs:min) | Fresh water | 10% solution sodium chloride | 2% calcium chloride |
|---|---|---|---|
| 0:01.5 | 4.4 | 4.0 | 5.0 |
| 0:02 | 5.7 | 5.0 | 5.6 |
| 0:03 | 7.0 | 6.6 | 7.2 |
| 0:04 | 8.0 | 8.0 | 8.0 |
| 0:05 | 8.6 | 9.0 | 8.8 |
| 0:10 | 10.4 | 11.0 | 10.4 |
| 0:15 | 10.8 | 11.4 | 10.8 |
| 0:30 | 10.0 | 11.0 | 10.6 |
| 1:00 | 9.2 | 11.0 | 10.4 |
| 3:00 | 5.6 | 10.0 | 9.6 |
| 6:00 | 3.4 | 8.8 | 8.0 |
| 24:00 | 1.6 | 5.0 | 6.0 |

Example III

The following fluid loss tests were made using core samples of a measured air permeabilty, expressed in millidarcies. These core samples were 6 inches in length with an area of 15.88 cm.². A differential pressure of 1000 p.s.i.g. at 125° F. was used in each test. All additives and fluid were premixed for 5 minutes using a bladeless blender. Concentrations of additives were based on 1000 gallons of 10% sodium chloride solution. In two of the tests, in addition to the hydroxyethyl cellulose (Natrosol HH), there were added 25 pounds of silica flour and calcium carbonate, respectively.

TABLE III

| Permeability time, min. ½ | 5.2 md., 20 lbs. hydroxyethyl cellulose, fluid loss, mil | 5.3 md., 20 lbs. hydroxyethyl cellulose, 25 lbs. silica flour, fluid loss, mil | 5.3 md., 20 lbs. hydroxyethyl cellulose, 25 lbs. calcium carbonate fluid loss, mil |
|---|---|---|---|
| 1 | 3.0 | 3.5 | 3.0 |
| 2 | 6.3 | 8.5 | 6.8 |
| 3 | 10.0 | 13.0 | 10.1 |
| 4 | 13.8 | 17.3 | 12.6 |
| 5 | 16.8 | 21.0 | 15.4 |
| 6 | 20.0 | 23.7 | 18.0 |

Example IV

Break time data were obtained as follows: 2000 cc. of solution was placed in a 2500 cc. beaker and stirred with an air mixer. The desired amount of gelling agent (Natrosol HH) was added and then mixed 5 minutes. The gelled solution was divided into 6 portions and placed in 80, 100, 120, 140, 160 and 180° water baths. The thickness of the portion was measured with a Fann V-G Meter at 300 r.p.m. The readings were recorded at various time intervals. The gellation rate data were obtained by placing 300 cc. of solution in a bladeless Waring blender. The desired amount of gelling agent was added and mixed for 1 minute. The gelled solution was placed on a Fann V-G Meter at 300 r.p.m. and readings recorded at various time intervals. The tests were made using three solutions, fresh water, 10% sodium chloride, and 2% calcium chloride.

TABLE IV.—BREAK TIME

[20 lbs. hydroxyethyl cellulose and 0.125 lb. ammonium persulfate per 1,000 gallons (Fann V-G meter at 300 r.p.m. vs. time)]

| Time (hrs.:min.) | Fresh water, temperature | | | | | |
|---|---|---|---|---|---|---|
| | 80° F. | 100° F. | 120° F. | 140° F. | 160° F. | 180° F. |
| 0:30 | 10.4 | 6.8 | 4.4 | 2.2 | 1.2 | 0.4 |
| 1:00 | 9.4 | 5.0 | 2.0 | 0.4 | 0.4 | 0.4 |
| 3:00 | 7.2 | 1.8 | 0.8 | 0.4 | 0.4 | 0.4 |
| 6:00 | 2.2 | 1.0 | 0.4 | 0.4 | 0.4 | 0.4 |

| Time (hrs.:min.) | 10% sodium chloride, temperature | | | | | |
|---|---|---|---|---|---|---|
| | 80° F. | 100° F. | 120° F. | 140° F. | 160° F. | 180° F. |
| 0:30 | 12.0 | 8.0 | 6.0 | 4.4 | 3.2 | 2.0 |
| 1:00 | 11.2 | 7.6 | 5.2 | 3.2 | 2.0 | 0.8 |
| 3:00 | 11.0 | 7.2 | 3.8 | 1.6 | 0.6 | 0.4 |
| 6:00 | 10.8 | 6.4 | 2.8 | 1.0 | 0.4 | 0.4 |
| 24:00 | 10.6 | 2.6 | 1.4 | 0.4 | 0.4 | 0.4 |

| Time (hrs.:min.) | 2% calcium chloride, temperature | | | | | |
|---|---|---|---|---|---|---|
| | 80° F. | 100° F. | 120° F. | 140° F. | 160° F. | 180° F. |
| 0:30 | 11.8 | 7.8 | 5.6 | 4.2 | 3.0 | 2.0 |
| 1:00 | 11.0 | 7.4 | 5.0 | 3.0 | 1.8 | 0.6 |
| 3:00 | 10.8 | 6.8 | 4.0 | 1.6 | 0.6 | 0.4 |
| 6:00 | 10.6 | 6.2 | 2.6 | 1.0 | 0.4 | 0.4 |
| 24:00 | 10.6 | 3.4 | 1.2 | 0.4 | 0.4 | 0.4 |

TABLE V.—GELLATION RATE

[20 lbs. hydroxyethyl cellulose and 0.125 lb. ammonium persulfate per 1,000 gallons (temperature, 80° F.)]

| Time (minutes) | Fann V-G meter at 300 r.p.m. vs. time | | |
|---|---|---|---|
| | Fresh water | 10% solution sodium chloride | 2% solution calcium chloride |
| 1.5 | 6.0 | 5.0 | 5.0 |
| 2 | 6.6 | 5.8 | 5.8 |
| 3 | 7.4 | 6.6 | 6.6 |
| 4 | 8.2 | 7.6 | 7.6 |
| 5 | 8.6 | 8.4 | 8.0 |
| 10 | 9.8 | 9.6 | 9.6 |
| 15 | 10.4 | 10.6 | 10.6 |

The break times in 10% sodium chloride and 2% calcium chloride solutions at 80° F. were slow. The break time above 100° F. was satisfactory. The foregoing data indicate that hydroxyethyl cellulose is very effective as a gelling agent for fluids to be used in the hydrafrac process.

As is indicated by the foregoing data, the hydroxyethyl cellulose is substantially as effective as a gelling agent in sodium chloride and calcium chloride solutions, as it is in fresh water. The data also indicate that the presence of an oxidizing agent such as ammonium persulfate is effective to cause the breaking of the gel. The inception of breaking can be adjusted by varying the amount of the oxidizing agent employed. This unique combination of properties illustrates the benefits attainable by the use of the novel thickened and gelled fluids of this invention.

Having fully described the invention, it is intended that it be limited only by the lawful scope of the appended claims.

We claim:

1. Method of fracturing in a well traversing a producing formation which comprises injecting into the well a thickened and gelled fluid comprising an aqueous solution of a salt selected from the group consisting of an alkali and alkaline earth metal chlorides, containing an effective thickening and gelling amount of hydroxyethyl cellulose said hydroxyethyl cellulose being present in an amount of at least about 20 pounds of hydroxyethyl cellulose per 1000 gallons of said solution, a 2% aqueous solution of said hydroxyethyl cellulose having a viscosity of at least about 80,000 centipoises at 25° C.

2. The method of claim 1 wherein said salt is an alkali metal chloride.

3. The method of claim 1 wherein said salt is an alkaline earth metal chloride.

4. The method of claim 1 wherein said fluid contains a granular material.

5. The method of claim 4 wherein the hydroxyethyl cellulose is subsequently removed from the formation.

6. The method of treating a well traversing a producing formation which comprises injecting a thickened and gelled fluid comprising an aqueous solution of a salt selected from the group consisting of an alkali and alkaline earth metal chloride containing an effective thickening and gelling amount of hydroxyethyl cellulose, into a confined zone of said well at a rate sufficient to increase the pressure exerted in said zone until formation fracture occurs, continuing to inject said fluid into the formation, thereafter permitting the gel to break and producing the well to remove the broken gel.

7. The method of claim 6 wherein the fluid additionally contains a granular material.

8. The method of claim 6 wherein the fluid additionally contains an oxidizing agent capable of breaking the gelled fluid.

9. The method of fracturing in a well traversing a producing formation which comprises injecting into the well a thickened and gelled fluid composition comprising a saturated aqueous solution of calcium chloride containing an effective thickening and gelling amount of hydroxyethyl cellulose said hydroxyethyl cellulose being present in an amount of at least about 20 pounds of hydroxyethyl cellulose per 1000 gallons of said solution, a 2% aqueous solution of said hydroxyethyl cellulose having a viscosity of at least about 80,000 centipoises at 25° C.

10. The method of fracturing in a well traversing a producing zone which comprises injecting into the formation in the vicinity of the producing zone a thickened and gelled fluid comprising an aqueous solution of a salt selected from the group consisting of alkali and alkaline earth metal chlorides, an effective thickening and gelling amount of hydroxyethyl cellulose and a granular material and subsequently removing the hydroxyethyl cellulose from the formation after oxidation by an oxidizing agent.

References Cited

UNITED STATES PATENTS

| | | | |
|---|---|---|---|
| 2,570,947 | 11/1945 | Himel et al. | 252—8.5 |
| 2,681,704 | 6/1954 | Menaul | 166—42 |
| 2,778,427 | 1/1957 | Cardwell et al. | 166—42 |
| 2,801,218 | 7/1957 | Menaul | 252—8.55 |
| 2,961,400 | 11/1960 | Park | 252—8.55 |
| 3,024,191 | 3/1962 | Jones | 166—42 X |
| 3,167,510 | 1/1965 | Alter | 252—8.55 |

STEPHEN J. NOVOSAD, *Primary Examiner.*